US009600232B2

(12) United States Patent
Bergkvist, Jr. et al.

(10) Patent No.: US 9,600,232 B2
(45) Date of Patent: Mar. 21, 2017

(54) ALIGNING FIFO POINTERS IN A DATA COMMUNICATIONS LANE OF A SERIAL LINK

(71) Applicant: International Business Machines Corporation, Armonk, NY (US)

(72) Inventors: John J. Bergkvist, Jr., Williston, VT (US); Carrie E. Cox, Apex, NC (US); John K. Koehler, Raleigh, NC (US); Todd E. Leonard, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 14/102,811

(22) Filed: Dec. 11, 2013

(65) Prior Publication Data

US 2015/0160920 A1 Jun. 11, 2015

(51) Int. Cl.
*G06F 3/00* (2006.01)
*G06F 5/06* (2006.01)
*G06F 13/16* (2006.01)
*G06F 13/38* (2006.01)

(52) U.S. Cl.
CPC .......... *G06F 5/065* (2013.01); *G06F 13/1673* (2013.01); *G06F 13/385* (2013.01)

(58) Field of Classification Search
None
See application file for complete search history.

(56) References Cited

U.S. PATENT DOCUMENTS

| 6,917,366 | B1 | 7/2005 | West et al. |
| 8,488,729 | B1 * | 7/2013 | Mendel ................... H04L 25/14 375/354 |
| 8,547,760 | B2 | 10/2013 | Jenkins et al. |

OTHER PUBLICATIONS

Lattice Semiconductor Corporation, "LatticeECP3 HDMI/DVI Interface", latticesemi.com (online), Apr. 2011, 25 pAGES, Lattice Semiconductor Corporation, Hillsboro, Oregon, USA. URL:http://www.latticesemi.com/documents/RD1097.pdf?jsessionid=f0305fbe4a0095dddff1e27551167b555978.

* cited by examiner

*Primary Examiner* — Idriss N Alrobaye
*Assistant Examiner* — Richard B Franklin
(74) *Attorney, Agent, or Firm* — Brandon C. Kennedy; Steven Meyers; Kennedy Lenart Spraggins LLP (57) ABSTRACT

Aligning FIFO pointers includes resetting, by a write control block coupled to a write side of the FIFO, write pointers to an initial value. Then, iteratively, until one or more bits retrieved from the write side match one or more bits of an alignment bit pattern: providing, by the write side to the read side, the alignment bit pattern; retrieving, by the read side, one or more bits from the write side; providing, by the read side through a read control block, the retrieved one or more bits to the write control block; determining, by the write control block, whether the retrieved one or more bits match one or more bits of the alignment bit pattern; and, if the retrieved one or more bits do not match one or more bits of the alignment bit pattern, suppressing the read pointer from incrementing for a predetermined period of time.

19 Claims, 3 Drawing Sheets

ALIGNING FIFO POINTERS IN A DATA COMMUNICATIONS LANE OF A SERIAL LINK

BACKGROUND

Technical Field

The technical field is data processing, or, more specifically, methods, apparatus, and products for aligning FIFO pointers in a data communications lane of a serial link.

Description of Related Art

In high speed serial data communications designs, data to be transmitted from a source to a target may begin provided by the source in parallel form and be transmitted to the target in serial form. In such systems the clock utilized to transmit the data in serial form is often times greater in rate than the clock which is used to provide the data in parallel form. Jitter and drift in the two separate clock signals generally causes the two clocks to operate plesio-synchronously with respect to one another, even in systems in which the clocks are based (through clock trees and the like) on the same system clock.

Some serial communications links are implemented with a number of lanes. Each such lane may include a First-in-First-Out buffer ('FIFO') that passes the data from the parallel side to the serial side of the transmitter. Each FIFO may include a write side and a read side. The write side of the FIFO receives data in parallel form from a source and the read side transmits the data in serial form to a target. The write side may operate on a system clock and the read side may operate on a separate clock that, like the serial clock mentioned above, is much higher in rate than the system clock. In such a system, two sets of signals utilized by each FIFO require alignment to insure that data transmitted serially is an accurate representation of the data received in parallel form. First, read and write pointers must be offset by a predetermined, or programmable amount, so the FIFO can absorb any clock phase alignment differences between the read and write clock. Second in a multiple lanes design it is important to align all the lanes to minimize the lane-to-lane skew when the data reaches the target at the other end of the serial link. In today's designs, aligning all the lanes together includes issuing a common reset to both the read and write side of the FIFO to set the correct offset for the read and write pointers. The read and write side clocks are plesio-synchronous, however. In addition, the difference in the arrival time of each lane's read clock can result in different lanes experiencing the reset in different cycles thereby causing the lanes to be skewed in an unpredictable way. If the user wishes to have the ability to have a programmable offset between the read and write pointers an additional bus would need to be synchronized into the high speed domain.

SUMMARY

Methods of aligning FIFO pointers in a data communications lane of a serial link are disclosed in this specification. FIFOs configured for such alignment and apparatus that includes many such FIFOs are also disclosed in this specification. Such FIFOs include: a write side coupled to a write control block and a read side coupled to a read control block, where: the write side is configured to operate on a write clock and a write pointer, the write pointer comprising a circular pointer incrementing in dependence upon on a rate of the write clock, the write side further configured to receive data in parallel form from a source and provide the received data to the read side; the read side configured to operate on a read clock and a read pointer, the read pointer comprising a circular pointer incrementing in dependence upon on a rate of the read clock, the read clock operating at a higher rate than the write clock, the read side further configured to retrieve data from the write side data and provide the data serially to a target; the write control block is configured to reset the write pointers to an initial value; and iteratively until one or more bits retrieved by the read side from the write side match one or more bits of an alignment bit pattern: the write side is further configured to provide the alignment bit pattern to the read side; the read side is further configured to retrieve one or more bits from the write side; the read side is further configured to provide the retrieved one or more bits to the write control block through the read control block; the write control block is further configured to determine whether the retrieved one or more bits match one or more bits of the alignment bit pattern; and the write control block is further configured to suppress the read pointer from incrementing for a predetermined period of time if the retrieved one or more bits do not match one or more bits of the alignment bit pattern.

The foregoing and other objects, features and advantages will be apparent from the following more particular descriptions of example embodiments as illustrated in the accompanying drawings wherein like reference numbers generally represent like parts of example embodiments.

DETAILED DESCRIPTION OF EXAMPLE EMBODIMENTS

Figure 1:
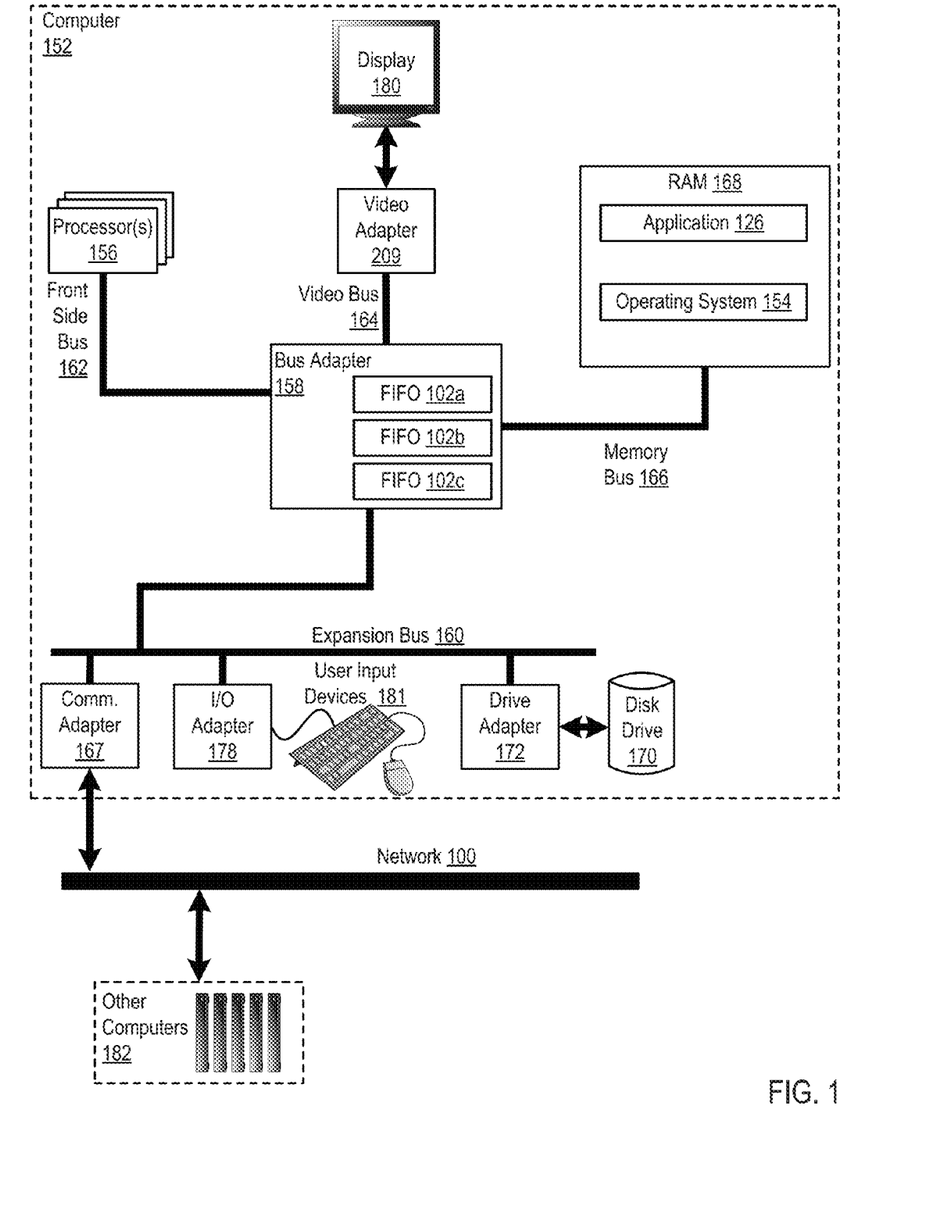
FIG. 1 sets forth a block diagram of a system that includes FIFOs configured for pointer alignment in accordance with embodiments.

Exemplary methods of aligning FIFO pointers in a data communications lane of a serial link, FIFOs configured for such alignment, and apparatus that include a number of such FIFOs are described with reference to the accompanying drawings, beginning with FIG. 1. FIG. 1 sets forth a block diagram of a system that includes FIFOs (102a, 102b, 102c) configured for pointer alignment in accordance with embodiments. The system of FIG. 1 includes an example of automated computing machinery in the form of a computer (152). The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

The example Bus Adapter (158) includes a number of FIFOs (102a, 102b, 102c). Each FIFO (102) is part of a lane of a serial data communications link (or 'serial link'). Each FIFO (102) is generally configured to receive data from a source, such as the processor (156), in parallel form and transmit the data to a source, such as RAM (168).

Each FIFO (102) is configured for pointer alignment in accordance with embodiments. Each FIFO (102) includes a write side coupled to a write control block and a read side coupled to a read control block. The term 'write side' as used in this specification refers to circuitry and signal lines within a FIFO that is configured to receive data in parallel form and provide the data to the read side for serial transmission. The term 'read side' as used in this specification refers to circuitry and signal lines of a FIFO that retrieves data from the write side of the FIFO and transmits the data to a target as a serial data transmission. The 'write control block' and 'read control block' may be implemented in a variety of ways including, for example, as a microcontroller, an FPGA ('Field Programmable Gate Array') or other circuitry.

In the example system of FIG. 1, the write side of each FIFO (102) is configured to operate on a write clock and a write pointer. The write pointer may be implemented as a circular pointer that increments in dependence upon (or 'based on') on a rate of the write clock. In some embodiments, for example, the circular pointer may be implemented as a circular counter that iteratively, increments from an initial value to a final value, then restarts incrementing from the initial value.

The read side of each FIFO (102) in the example of FIG. 1 is configured to operate on a read clock and a read pointer. The read pointer, like the write pointer may be implemented as a circular pointer that increments in dependence upon on a rate of the read clock. Also like the write pointer, the read pointer may, in some embodiments, be implemented as a circular counter. In the example of FIG. 1, the read clock is configured to operate at a higher rate than the write clock. In some embodiments, the read clock is configured to operate a rate eight to ten times the rate of the write clock.

To align the pointers according to embodiments, the write control block of each FIFO (102) in the example of FIG. 1 is configured to insure, first, that the pointers are not in alignment. Because the read pointer operates on a clock that has a greater frequency than the write pointer, it is possible that, during the alignment process described below, the read pointer may provide results that appear to indicate that the read and write pointer are aligned, but in fact the two are not. To reduce the possibility of such aliasing, the write control block is configured to insure that the two are out of alignment at the outset, prior to beginning the alignment process. Once the write control block initially determines that the read and write pointers are not aligned, the write control block may repeat the test a predefined number of times to insure accuracy. Multiple samples of the non-alignment may be used to mitigate effects of metastability in the system.

Next, the write control block may reset the write pointers to an initial value. Then an iterative process is carried out by each FIFO until one or more bits retrieved by the read side from the write side match one or more bits of an alignment bit pattern. The process includes providing the alignment bit pattern by the write side to the read side, retrieving one or more bits from the write side by the read side, and providing the retrieved one or more bits to the write control block by the read side through a read control block. The write control block may then determine whether the retrieved one or more bits match one or more bits of the alignment bit pattern. If the retrieved one or more bits do not match one or more bits of the alignment bit pattern, the write control block suppresses the read pointer from incrementing for a predetermined period of time. This process repeats until one or more bits retrieved by the read side and provided to the write control block match one or more bits in the alignment bit pattern.

Consider, an example alignment bit pattern of eight bits of Ser. No. 10000000. In this example, if the read side provides a value other a '1' to the write control block, the read pointer is not aligned. In that case, the write control block suppresses the read pointer (for a single read clock cycle in some embodiments) and checks for a match with the next bit received from the read side. The process continues until the read side provides a value of '1' to the write control block. In this way, each of the FIFOs (102) in the example of FIG. 1 may, separately and in parallel, align the read pointers used to operate the FIFO. Once each read pointer of each separate FIFO is aligned, the lanes that include the FIFOs are also aligned to one another. Although described here with respect to only a single bit being checked for a match, readers of skill in the art will understand that any number of bits may be checked for a match. In such a way, metastability may be mitigated in each lane.

In some embodiments, the write control block may track the number of clock cycles suppressed while aligning the read pointer. The write control block may provide that number to another controller, such a bus controller or the like, such that the number of clock cycles suppressed during alignment may be used immediately as a programmable offset upon initialization of the FIFO.

Stored in RAM (168) is an application (126), a module of computer program instructions for carrying out user-level data processing tasks. Also stored in RAM (168) is an operating system (154). Examples of operating systems may include UNIX™ Linux™ Microsoft XP™ AIX™ IBM's i5/OS™ and others as will occur to those of skill in the art. The operating system (154), and application (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for aligning FIFO pointers in a data communications lane of a serial link according to embodiments include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated in FIG. 1.

Figure 2:
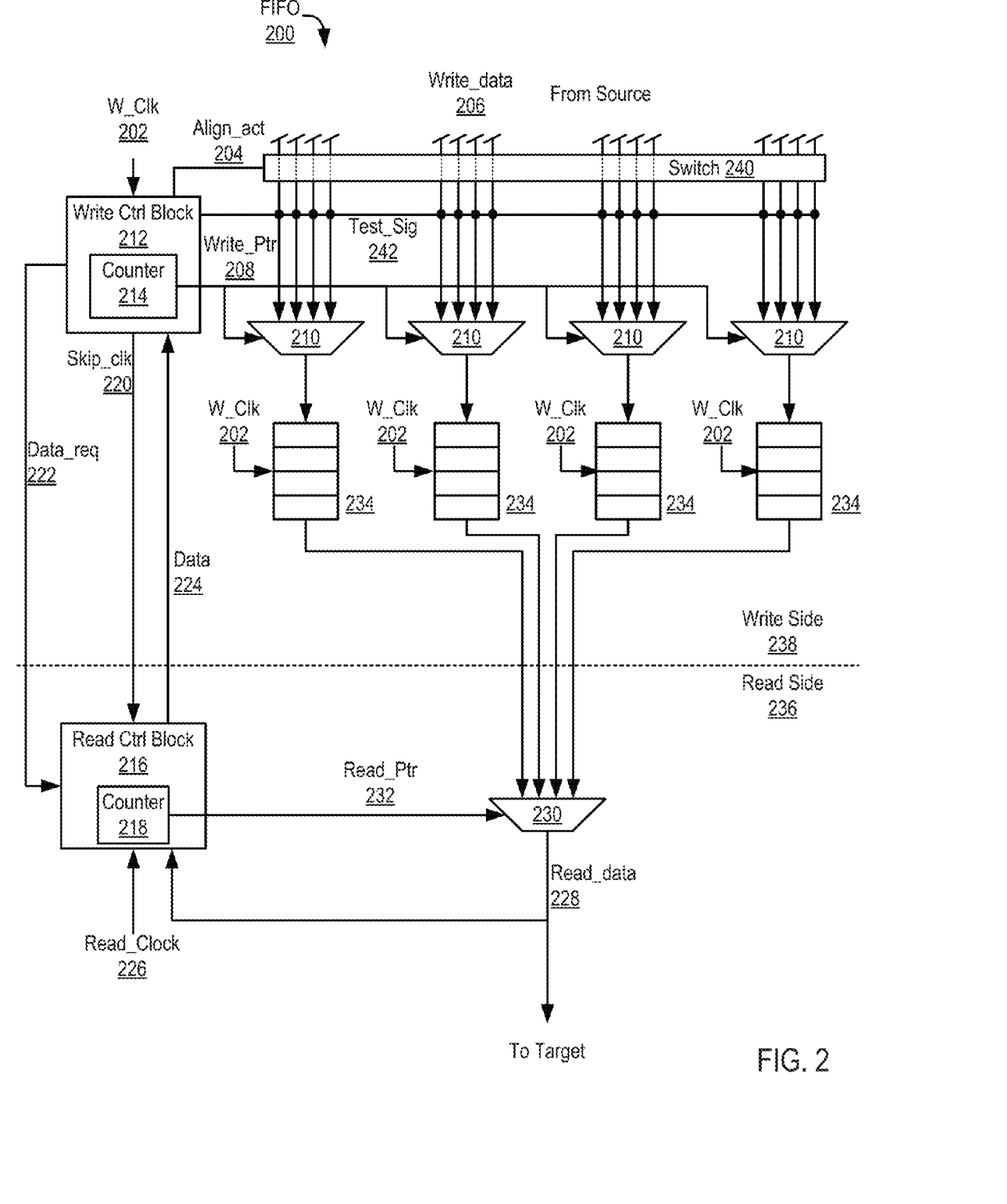
FIG. 2 sets forth an example FIFO configured for pointer alignment in accordance with embodiments.

For further explanation, FIG. 2 sets forth an example FIFO configured for pointer alignment in accordance with embodiments. The FIFO (200) of FIG. 2 includes a write side (238) coupled to a write control block (212) and a read side (236) coupled to a read control block (216). The write side (238) in the example of FIG. 1 includes a plurality of write side multiplexers (210) and a plurality of write side buffers (234). Each write side multiplexer (210) is configured to receive write data signal lines (206) as data inputs. In the example of FIG. 2, each of the write side multiplexers (210) is configured to receive four separate data signal lines as data inputs from a source. Each write side multiplexer (210) is also coupled at an output to a separate one of the write side buffers (234). Each write side buffer is configured to store data provided by the multiplexer and provide the data to a read side multiplexer (230) which is described below in greater detail.

Each of the write side multiplexers (210) is also configured to receive the write pointer (208) as a control input. The control input provides a selection of one of the inputs of the multiplexer (210) to couple to the output of the multiplexer (210). The write pointer (208) is provided in the example of FIG. 1 by a circular counter (214) implemented as a part of the write control block (212). Readers of skill in the art will recognize, however, that such a counter (214) may be implemented in other ways, as a component separate from the write control block (212).

The read side (236) of the example FIFO (200) of FIG. 2 includes a read side multiplexer (230). The read side multiplexer (230) receives an output of each of the write side buffers (234) as a data input. The read side multiplexer also receives the read pointer (232) as a control input. The read pointer (232) is provided by a circular counter (218), implemented in the example of FIG. 2 as a component of the read control block (216). Readers of skill in the art will recognize, however, that the counter (216) may be implemented in a variety of other ways, as a component separate from the read control block (216). The read side multiplexer (230) is configured providing read data (228) in serial form as an output of the read side multiplexer (230).

The read data signal line (228) is coupled both to a target and the read control block (216). In this way, the read control block (216) is configured to receive the output of the read side multiplexer (230). The read control block is also capable of providing that output to the write control block (212) through the data signal line (224).

The FIFO (200) in the example of FIG. 2 is configured for pointer alignment according to embodiments. Such pointer alignment may be carried out by first, determining whether the FIFO is currently performing an alignment test. If the FIFO is currently performing an alignment test, beginning another alignment test may result in aliasing. As such, alignment testing begins only if an alignment test is not already underway. Such alignment testing begins by resetting the write pointers (208) to an initial value by the write control block (212).

The write control block (212) may then signal the write side (238) to ignore input data (206) other than the alignment bit pattern. The write control block (212) may signal the write side (238) to ignore input data (206) by decoupling the write data signal lines (206) through the align activate signal line (204) and the switch (240). Further, the test signal line (242) may be utilized to provide the write multiplexers (210) with the alignment bit pattern as data inputs.

The write side (238) may then provide the alignment bit pattern to the read side. The write side (238) may provide the alignment bit pattern through the write multiplexers (210) and the write buffers (234). The write buffers (234) may be implemented as a series of latches or in other ways as will occur to readers of skill in the art. The output of the write buffers (234) is coupled to the input of the read side multiplexer (230).

The read side (236) may then retrieve one or more bits from the write side. Depending on the value of the read pointer (232) the read side multiplexer (230) may be configured to pass through the multiplexer an output of one of the write buffers (234).

The read side (236) may then provide the retrieved one or more bits to the read control block (216) which in turn may provide the retrieved one or more bits to the write control block (212) through the data signal line (224). In some embodiments, the data request signal line (222) is utilized to inform the read control block to provide the read data (228) received from the read side multiplexer (230) to the write control block (212).

The write control block (212) may determine whether the retrieved one or more bits match one or more bits of the alignment bit pattern. If the retrieved one or more bits do not match one or more bits of the alignment bit pattern, the write control block (212) may suppress the read pointer (232) from incrementing for a predetermined period of time. In some embodiments, the write control block may suppress the read pointer (232) from incrementing for a single read clock (226) cycle. The write control block (212) may suppress the incrementing of the read pointer (232) in the example of FIG. 2 by signaling the read control block (216) through the skip clock signal line (220). The read control block (216), responsive to that signal, may then gate the read clock (226) provided to the counter for a clock cycle. The process of retrieving one or more bits, providing the one or more bits to the write side, and determining whether the retrieved one or more bits match one or more bits of the alignment bit pattern may repeat, iteratively, until the retrieved one or more bits match one or more bits of the alignment bit pattern. In this way, the read pointer is effectively skewed into alignment through suppression.

Once the write control block (212) determines that the retrieved one or more bits provided by the read side multiplexer (230) match one or more bits of the alignment bit pattern, the write control block (212) may take the FIFO out of the alignment process by removing the signal on the data request signal line (222) and recoupling the write data signal lines via the align activation signal line (204) and the switch (240), thereby allowing normal write data (206) to be passed through the FIFO.

Figure 3:
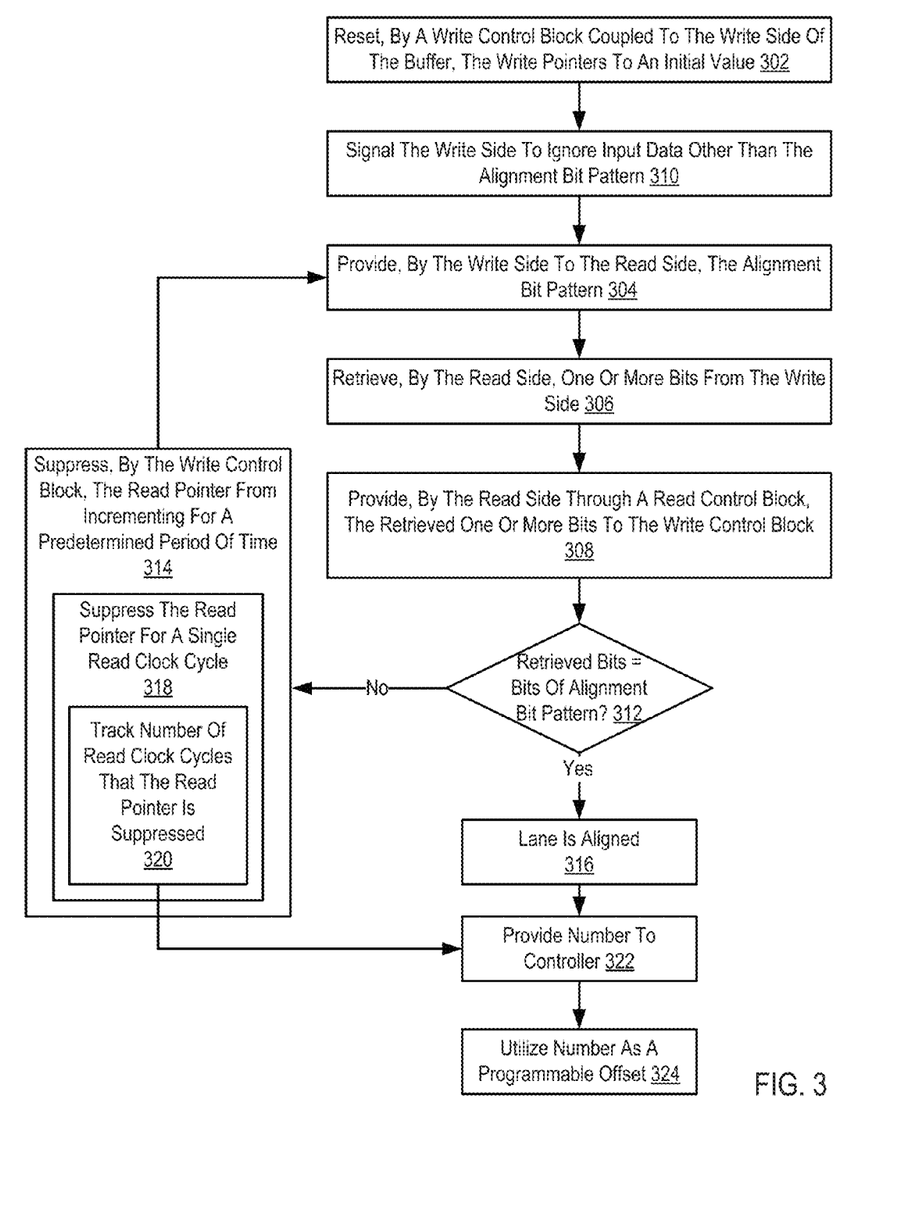
FIG. 3 sets forth a flow chart illustrating an exemplary method for aligning FIFO pointers in a data communications lane of a serial link according to embodiments.

For further explanation, FIG. 3 sets forth a flow chart illustrating an exemplary method for aligning FIFO pointers in a data communications lane of a serial link according to embodiments. The method of FIG. 3 may be carried out in a FIFO similar to that depicted in the example of FIG. 2: a FIFO that includes a write side configured to operate on a write clock and a write pointer and a read side configured to operate on a read clock and a read pointer.

Although not shown here, the method of FIG. 3 may begin with sending a reset signal from the write control block to the read control block instructing the system to cease any previous alignment testing, flush the system of any stale data, and being a new alignment test.

The method of FIG. 3 continues by resetting (302), by a write control block coupled to the write side of the FIFO, the write pointers to an initial value. To reduce the possibility of aliasing during the alignment process, resetting (302) the write pointers to an initial value may include insuring that the read and write pointers are not in alignment, prior to the aligning process. Resetting (302) the write pointers to an initial value may be carried out in various ways, including for example, asserting a signal on a signal line designated for such purpose.

The method of FIG. 3 also includes signaling (310) the write side to ignore input data other than the alignment bit pattern. Signaling (310) the write side to ignore input data other than the alignment bit pattern may be carried out by decoupling write data signal lines normally utilized to provide data to the write side multiplexers of the FIFO.

The method of FIG. 3 also includes providing (304), by the write side to the read side, the alignment bit pattern. Providing (304) the alignment bit pattern to the read side may be carried out, similar to the examples provided with regard to FIG. 2, by providing the alignment bit pattern through write side multiplexers and write buffers to a read side multiplexer. In some embodiments, the alignment bit pattern may be a fixed value, stored by a manufacturer of the FIFO for alignment purposes transparent to a user. In other embodiments, by contrast, the alignment bit pattern may be a user-programmable pattern.

The method of FIG. 3 also includes retrieving (306), by the read side, one or more bits from the write side. Retrieving (306) one or more bits from the write side may be carried out by selecting, in dependence upon the value of the read pointer, an input of the read side multiplexer to be output of the read side multiplexer, where the inputs of the read side multiplexer are coupled to the output of write side buffers (like those depicted in FIG. 2).

The method of FIG. 3 also includes providing (308), by the read side through a read control block, the retrieved one or more bits to the write control block. As described above with respect to FIG. 2, providing (308) the retrieved one or more bits to the write control block may be carried out by providing the one or more bits as an output of the read side multiplexer to the read control block which, in turn, provides the one or more bits to the write control block through a signal line designated for such purpose.

The method of FIG. 3 also includes determining (312), by the write control block, whether the retrieved one or more bits match one or more bits of the alignment bit pattern. Determining (312) whether the retrieved one or more bits match one or more bits of the alignment bit pattern may be carried out in a variety of ways including, for example, by performing a logical AND operation with the values of one or more bits of the alignment bit pattern and the retrieved one or more bits.

If the retrieved one or more bits match one or more bits of the alignment bit pattern, the method of FIG. 3 is complete and the lane is aligned (306). If, however, the retrieved one or more bits does not match one or more bits of the alignment bit pattern, the method of FIG. 3 continues by suppressing (314), by the write control block, the read pointer from incrementing for a predetermined period of time. In the example of FIG. 3, suppressing (314) the read pointer from incrementing for a predetermined period of time may include suppressing (318) the read pointer for a single read clock cycle. Suppressing (318) the read pointer for a single read clock cycle may be carried out by causing the read control block to gate the read clock provided to a counter that provides the read pointer. In the method of FIG. 3, suppressing (318) the read pointer for a single read clock cycle includes tracking a number of read clock cycles that the read pointer is suppressed. In the method of FIG. 3, after alignment is completed (316), the number of clock cycles may be provided to a controller (such as bus controller) where that controller utilizes (324) the number of read clock cycles that the read pointer was suppressed during alignment testing as a programmable offset (324) upon a future initialization of the FIFO.

Once the read pointer is suppressed (314), the method returns to providing (304) the alignment bit pattern. In this way, the steps of providing (304) the alignment bit pattern, retrieving (308) one or more bits from the write side, providing (308) the retrieved one or more bits to the write control block, and determining (312) whether the retrieved one or more bits match one or more bits of the alignment bit pattern are carried out iteratively, until one or more bits retrieved by the read side from the write side match one or more bits of the alignment bit pattern. It is noted that the alignment process here, may be repeated a number of times to insure accuracy of the results of the alignment process and reduce the effects of metastability in the system.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described above with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A method of aligning first-in-first-out buffer ('FIFO') pointers in a data communications lane of a serial link, the lane comprising a FIFO, wherein the FIFO comprises: a write side configured to operate on a write clock and a write pointer, the write pointer comprising a circular pointer incrementing in dependence upon a rate of the write clock; a read side configured to operate on a read clock and a read pointer, the read pointer comprising a circular pointer incrementing in dependence upon a rate of the read clock, the read clock operating at a higher rate than the write clock; the write side further configured to receive data in parallel form from a source; and the read side configured to provide data serially to a target, wherein the method comprises:
   resetting, by a write control block coupled to the write side of the FIFO, the write pointers to an initial value;
   iteratively, until a one or more bits retrieved by the read side from the write side match one or more bits of an alignment bit pattern:
   providing, by the write side to the read side, the alignment bit pattern;
   retrieving, by the read side, one or more bits from the write side;
   providing, by the read side through a read control block, the retrieved one or more bits to the write control block;
   determining, by the write control block, whether the retrieved one or more bits match one or more bits of the alignment bit pattern; and
   if the retrieved one or more bits do not match one or more bits of the alignment bit pattern, suppressing, by the write control block, the read pointer from incrementing for a predetermined period of time.

2. The method of claim 1 wherein the serial link further comprises a plurality of lanes and the method is carried out for each lane in parallel.

3. The method of claim 1 wherein suppressing the read pointer from incrementing for a predetermined period of time further comprises suppressing the read pointer for a single read clock cycle.

4. The method of claim 1 wherein the alignment bit pattern further consists of one of: a fixed value or a programmable value.

5. The method of claim 1 wherein resetting, by a write control block coupled to the write side of the FIFO, the write pointers to an initial value further comprises insuring that the read and write pointers are not in alignment.

6. The method of claim 1 further comprising signaling the write side to ignore input data other than the alignment bit pattern until one or more bits retrieved by the read side from the write side match one or more bits of the alignment bit pattern.

7. A hardware first-in-first-out buffer ('FIFO') configured for pointer alignment, the FIFO comprising:
a write side coupled to a write control block and a read side coupled to a read control block, wherein:
the write side is configured to operate on a write clock and a write pointer, the write pointer comprising a circular pointer incrementing in dependence upon a rate of the write clock, the write side further configured to receive data in parallel form from a source and provide the received data to the read side;
the read side configured to operate on a read clock and a read pointer, the read pointer comprising a circular pointer incrementing in dependence upon a rate of the read clock, the read clock operating at a higher rate than the write clock, the read side further configured to retrieve data from the write side data and provide the data serially to a target;
the write control block is configured to reset the write pointers to an initial value; and
iteratively until one or more bits retrieved by the read side from the write side match one or more bits of an alignment bit pattern:
the write side is further configured to provide the alignment bit pattern to the read side;
the read side is further configured to retrieve one or more bits from the write side;
the read side is further configured to provide the retrieved one or more bits to the write control block through the read control block;
the write control block is further configured to determine whether the retrieved one or more bits match one or more bits of the alignment bit pattern; and
the write control block is further configured to suppress the read pointer from incrementing for a predetermined period of time if the retrieved one or more bits do not match one or more bits of the alignment bit pattern.

8. The FIFO of claim 7 wherein:
the write side comprises a plurality of write side multiplexers and a plurality of write side buffers, each write side multiplexer receiving write data signal lines as data inputs, each write side multiplexer coupled at an output to a separate one of the write side buffers, and each of the write side multiplexers receiving the write pointer as a control input;
the read side comprising a read side multiplexer, the read side multiplexer receiving an output of each of the write side buffers as a data input, the read side multiplexer receiving the read pointer as a control input, and the read side multiplexer providing read data as an output of the read side multiplexer; and
the read control block is configured to receive the output of the read side multiplexer and provide the output to the write control block.

9. The FIFO of claim 7 wherein the write control block is further configured to suppress the read pointer from incrementing for a predetermined period of time if the retrieved bit does not match the first bit of the alignment bit pattern by suppressing the read pointer for a single read clock cycle.

10. The FIFO of claim 7 wherein the alignment bit pattern further consists of one of: a fixed value or a programmable value.

11. The FIFO of claim 7 wherein resetting, by a write control block coupled to the write side of the FIFO, the write pointers to an initial value further comprises insuring that the read and write pointers are not in alignment.

12. The FIFO of claim 7 wherein the write control block is further configured to signal the write side to ignore input data other than the alignment bit pattern until one or more bits retrieved by the read side from the write side match one or more bits of the alignment bit pattern.

13. An apparatus comprising:
a plurality of hardware first-in-first-out buffers ('FIFOs') configured for pointer alignment in a serial link, the serial link comprising a plurality of lanes with each lane comprising one of the FIFOs and each FIFO comprising:
a write side coupled to a write control block and a read side coupled to a read control block, wherein:
the write side is configured to operate on a write clock and a write pointer, the write pointer comprising a circular pointer incrementing in dependence upon a rate of the write clock, the write side further configured to receive data in parallel form from a source and provide the received data to the read side;
the read side configured to operate on a read clock and a read pointer, the read pointer comprising a circular pointer incrementing in dependence upon a rate of the read clock, the read clock operating at a higher rate than the write clock, the read side further configured to retrieve data from the write side data and provide the data serially to a target;
the write control block is configured to reset the write pointers to an initial value; and
iteratively until one or more bits retrieved by the read side from the write side match one or more bits of an alignment bit pattern:
the write side is further configured to provide the alignment bit pattern to the read side;
the read side is further configured to retrieve one or more bits from the write side;
the read side is further configured to provide the retrieved one or more bits to the write control block through the read control block;
the write control block is further configured to determine whether the retrieved one or more bits match one or more bits of the alignment bit pattern; and
the write control block is further configured to suppress the read pointer from incrementing for a predetermined period of time if the retrieved one or more bits do not match one or more bits of the alignment bit pattern.

14. The apparatus of claim 13 wherein:
the write side comprises a plurality of write side multiplexers and a plurality of write side buffers, each write side multiplexer receiving write data signal lines as data inputs, each write side multiplexer coupled at an output to a separate one of the write side buffers, and each of the write side multiplexers receiving the write pointer as a control input;

the read side comprising a read side multiplexer, the read side multiplexer receiving an output of each of the write side buffers as a data input, the read side multiplexer receiving the read pointer as a control input, and the read side multiplexer providing read data as an output of the read side multiplexer; and the read control block is configured to receive the output of the read side multiplexer and provide the output to the write control block.

15. The apparatus of claim 13 wherein the write control block is further configured to suppress the read pointer from incrementing for a predetermined period of time if the retrieved bit does not match the first bit of the alignment bit pattern by suppressing the read pointer for a single read clock cycle.

16. The apparatus of claim 13 wherein the alignment bit pattern further consists of one of: a fixed value or a programmable value.

17. The apparatus of claim 13 wherein resetting, by a write control block coupled to the write side of the FIFO, the write pointers to an initial value further comprises insuring that the read and write pointers are not in alignment.

18. The apparatus of claim 13 wherein the write control block is further configured to signal the write side to ignore input data other than the alignment bit pattern until one or more bits retrieved by the read side from the write side match one or more bits of the alignment bit pattern.

19. The apparatus of claim 13 wherein the write control block is further configured to:

track a number of read clock cycles that the read pointer was suppressed before one or more bits retrieved by the read side from the write side match one or more bits of the alignment bit pattern; and provide the number of clock cycles to a controller, wherein the controller is configured to utilize the number of clock cycles as a programmable offset upon an initialization of the FIFO.

\* \* \* \* \*